(12) United States Patent
Villiger et al.

(10) Patent No.: US 11,536,096 B2
(45) Date of Patent: Dec. 27, 2022

(54) DOWNHOLE CABLES HAVING EXTRUDED ALUMINUM ENCAPSULATION LAYERS

(71) Applicant: AFL Telecommunications LLC, Duncan, SC (US)

(72) Inventors: Brett Villiger, Simpsonville, SC (US); Joseph Cignarale, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 238 days.

(21) Appl. No.: 16/491,918

(22) PCT Filed: Feb. 22, 2018

(86) PCT No.: PCT/US2018/019084
§ 371 (c)(1),
(2) Date: Sep. 6, 2019

(87) PCT Pub. No.: WO2018/164842
PCT Pub. Date: Sep. 13, 2018

(65) Prior Publication Data
US 2021/0140248 A1    May 13, 2021

Related U.S. Application Data

(63) Continuation of application No. 15/451,935, filed on Mar. 7, 2017, now abandoned.

(51) Int. Cl.
*H01B 11/22* (2006.01)
*E21B 17/20* (2006.01)
(Continued)

(52) U.S. Cl.
CPC .......... *E21B 17/206* (2013.01); *E21B 47/12* (2013.01); *E21B 47/135* (2020.05); *G02B 6/4415* (2013.01); *G02B 6/4488* (2013.01); *H01B 1/02* (2013.01); *H01B 3/441* (2013.01); *H01B 3/445* (2013.01); *H01B 7/201* (2013.01); *H01B 7/205* (2013.01)

(58) Field of Classification Search
CPC ............................... H01B 11/22; G02B 6/443
See application file for complete search history.

(56) References Cited

U.S. PATENT DOCUMENTS 3,602,633 A * 8/1971 Miller .................... H01B 9/022
                                                        174/36
4,432,605 A * 2/1984 Niiro .................... G02B 6/4427
                                                        385/111

(Continued)

FOREIGN PATENT DOCUMENTS

| CA | 2848234 A1 | 3/2013 |
|----|------------|--------|
| EP | 3064974 A1 | 9/2016 |
| WO | WO2017/115131 A1 | 7/2017 |

OTHER PUBLICATIONS

AFL Telecommunications LLC; International Patent Application No. PCT/US2018/019084; International Search Report; dated Jun. 18, 2018; (3 pages).

*Primary Examiner* — Chau N Nguyen
(74) *Attorney, Agent, or Firm* — Dority & Manning, P.A.

(57) ABSTRACT

A downhole cable includes a central core. The central core includes a metal tube having a plurality of optical fibers therein or a copper wire. The downhole cable further includes an extruded aluminum tube surrounding the central core.

9 Claims, 10 Drawing Sheets

(51) Int. Cl.
*H01B 7/20* (2006.01)
*H01B 3/44* (2006.01)
*H01B 1/02* (2006.01)
*G02B 6/44* (2006.01)
*E21B 47/12* (2012.01)
*E21B 47/135* (2012.01)

(56) References Cited

U.S. PATENT DOCUMENTS

| | | | | |
|---|---|---|---|---|
| 6,404,961 | B1* | 6/2002 | Bonja | G02B 6/4484 |
| | | | | 385/109 |
| 7,024,081 | B2* | 4/2006 | Dowd | G02B 6/4492 |
| | | | | 166/351 |
| 2006/0153508 | A1 | 7/2006 | Bowker | |
| 2008/0247718 | A1 | 10/2008 | Dowd | |
| 2011/0088259 | A1 | 4/2011 | Dowd | |
| 2013/0336612 | A1* | 12/2013 | Pearce | E21B 47/017 |
| | | | | 385/12 |
| 2015/0129751 | A1* | 5/2015 | Wysocki | G01V 11/002 |
| | | | | 250/227.11 |
| 2017/0184804 | A1* | 6/2017 | Lowell | H01B 11/1834 |

* cited by examiner

FIG. 20

DOWNHOLE CABLES HAVING EXTRUDED ALUMINUM ENCAPSULATION LAYERS

CROSS-REFERENCE TO RELATED APPLICATIONS

This application is a National Stage Patent Application of PCT/US2018/019084, filed on Feb. 22, 2018, which is a continuation of U.S. patent application Ser. No. 15/451,935, filed on Mar. 7, 2017, the disclosures of all of which are incorporated by reference herein in their entireties.

FIELD OF THE INVENTION

The present disclosure relates generally to downhole cables, and more particularly to downhole cables having extruded aluminum encapsulation layers.

BACKGROUND OF THE INVENTION

In industries such as the oil and gas industry, wells are utilized to provide access to raw materials. A variety of cables may be utilized in the wells, and various of these cables, termed downhole cables, may perform specified functions. For example, downhole cables may include electrical or optical sensors to monitor the well, or may be utilized to support and power equipment or tools connected to an end of the downhole cables. In some cases, for example, optical fibers may utilized for acoustic, strain, temperature, and/or pressure sensing. Such sensing can in some cases be distributed sensing, i.e. along the entire lengths of the fibers.

Known downhole cables typically include insulated copper wire conductors or optical fiber-containing metal tubes that are belted to a certain diameter with a polymer layer and then processed into a metal pipe. The metal pipe can be very expensive depending on the material used. For example stainless steel and nickel-based alloys are frequently utilized, and these materials can be very expensive. The pipe is then jacketed with a polymer that is selected based on application. Because of the extreme, high temperature environments in which many downhole cables are utilized, the polymer jacket is typically formed from an expensive polymer such as a flouropolymer. Together, the pipe and jacket make such downhole cables extremely expensive and sometimes unaffordable for the industry.

Accordingly, improved downhole cables are desired in the art. In particular, downhole cables which are relatively less expensive to produce while being suitably robust for their applications would be advantageous.

BRIEF DESCRIPTION OF THE INVENTION

Aspects and advantages of the invention will be set forth in part in the following description, or may be obvious from the description, or may be learned through practice of the invention.

In accordance with one embodiment of the present disclosure, a downhole cable is provided. The downhole cable includes a central core. The central core includes a metal tube having a plurality of optical fibers therein or a copper wire. The downhole cable further includes an extruded aluminum tube surrounding the central core.

In accordance with another embodiment of the present disclosure, a downhole cable is provided. The downhole cable includes a central core. The central core includes a metal tube having a plurality of optical fibers therein or a copper wire. The downhole cable further includes an extruded aluminum tube surrounding and directly contacting the central core. The downhole cable has a maximum outer width of less than or equal to 12 millimeters.

In accordance with another embodiment of the present disclosure, a downhole cable is provided. The downhole cable includes a central core. The central core includes a metal tube having a plurality of optical fibers therein or a copper wire. The downhole cable further includes an extruded aluminum tube surrounding the central core, and a metal pipe disposed between the central core and the extruded aluminum tube. The downhole cable has a maximum outer width of less than or equal to 12 millimeters.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 1:
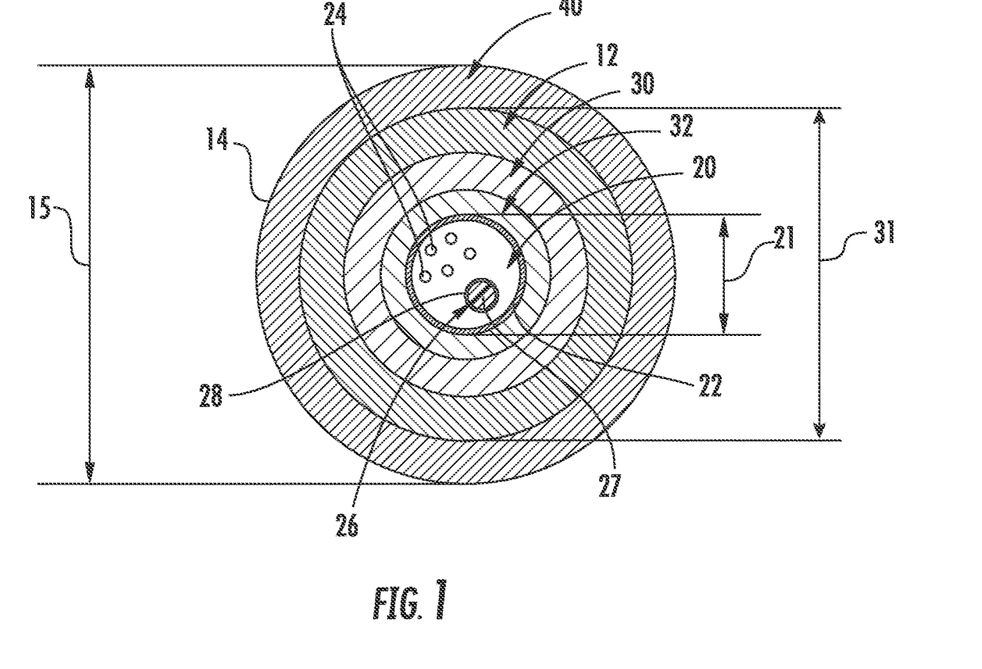
FIGS. 1-20 illustrate cross-sectional profile views of downhole cables in accordance with embodiments of the present disclosure.
Figure 2:
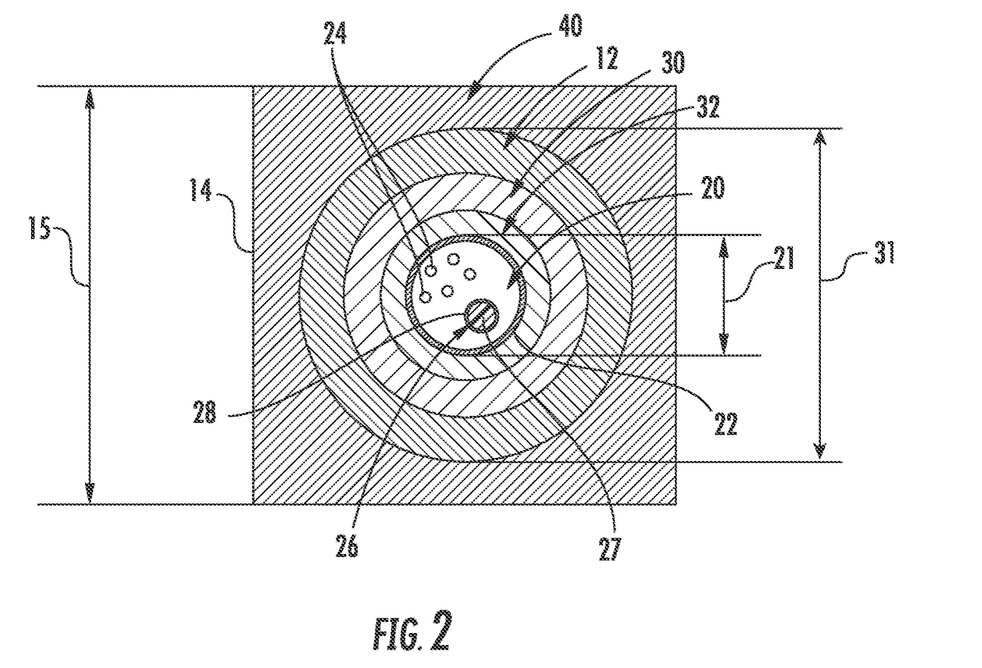
Figure 3:
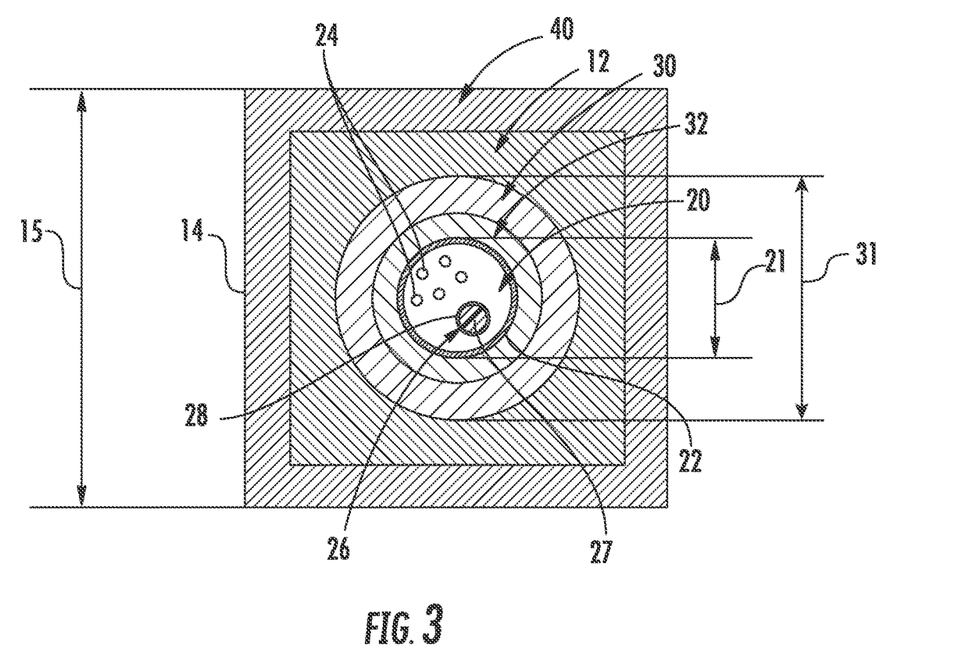
Figure 4:
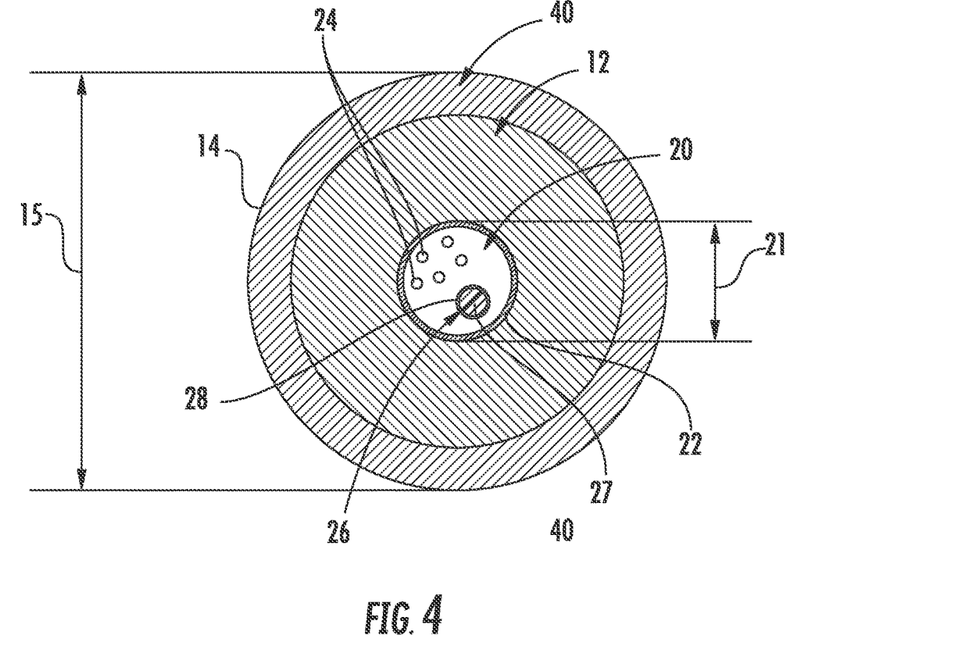
Figure 5:
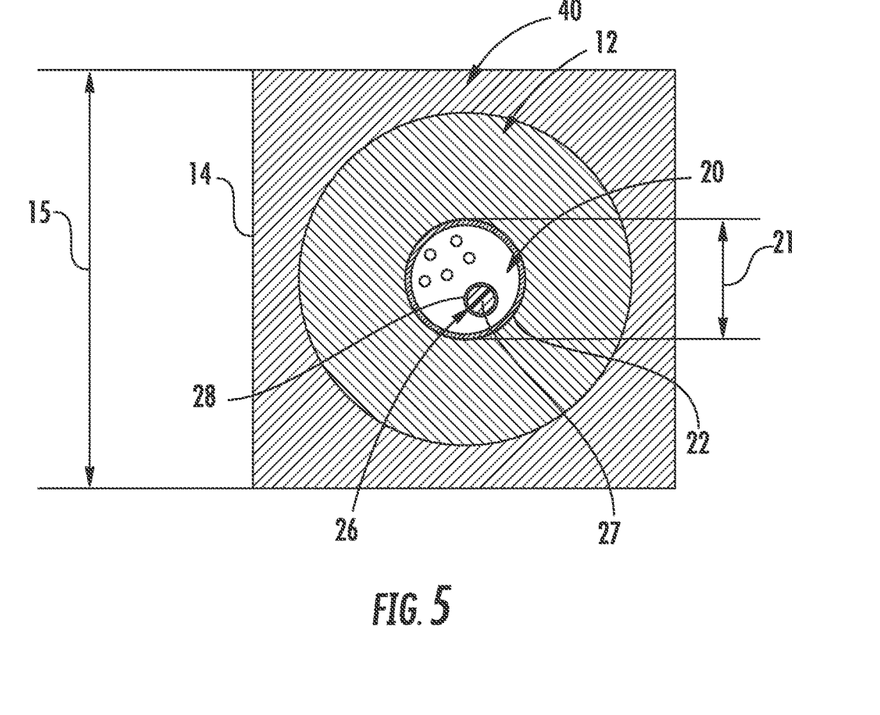
Figure 6:
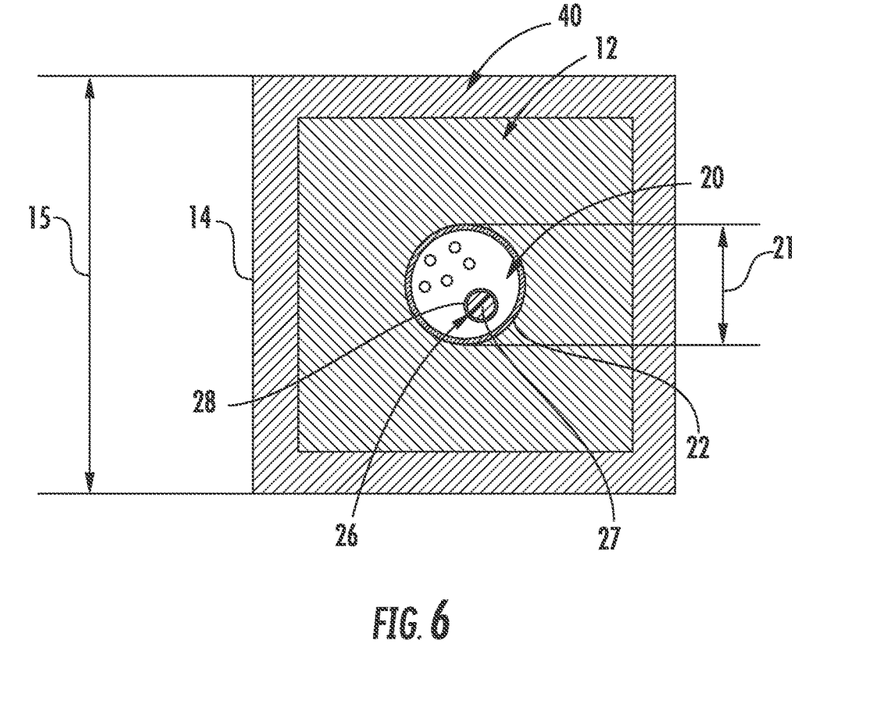
Figure 7:
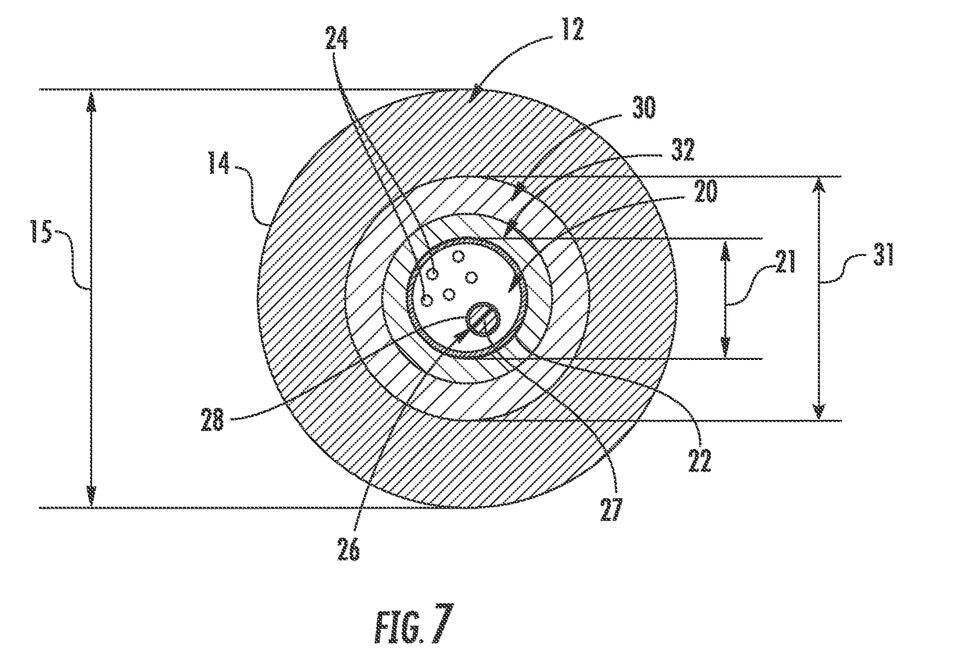
Figure 8:
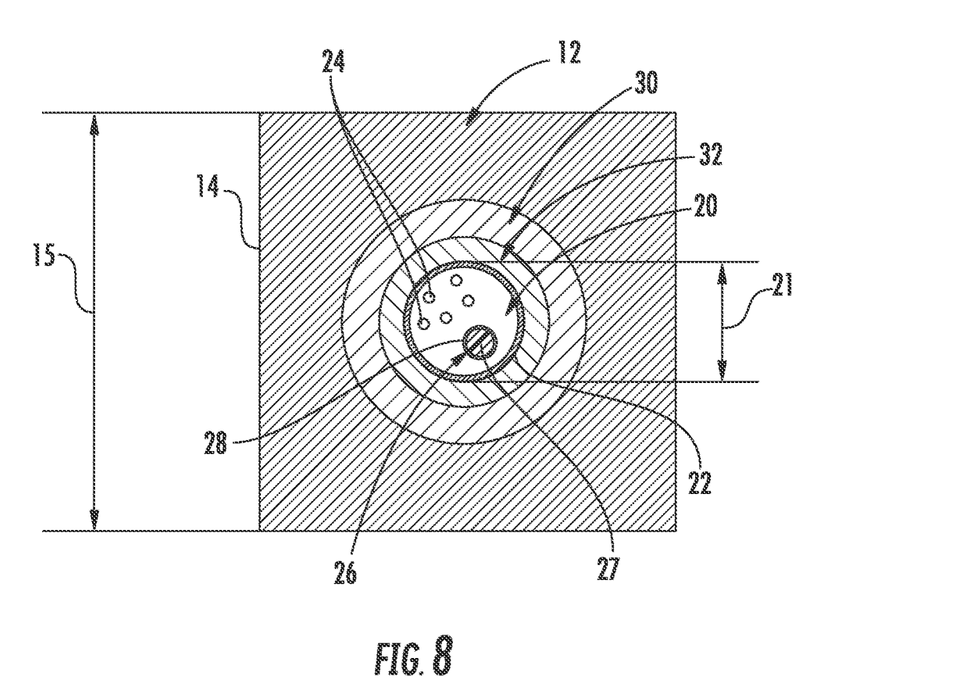
Figure 9:
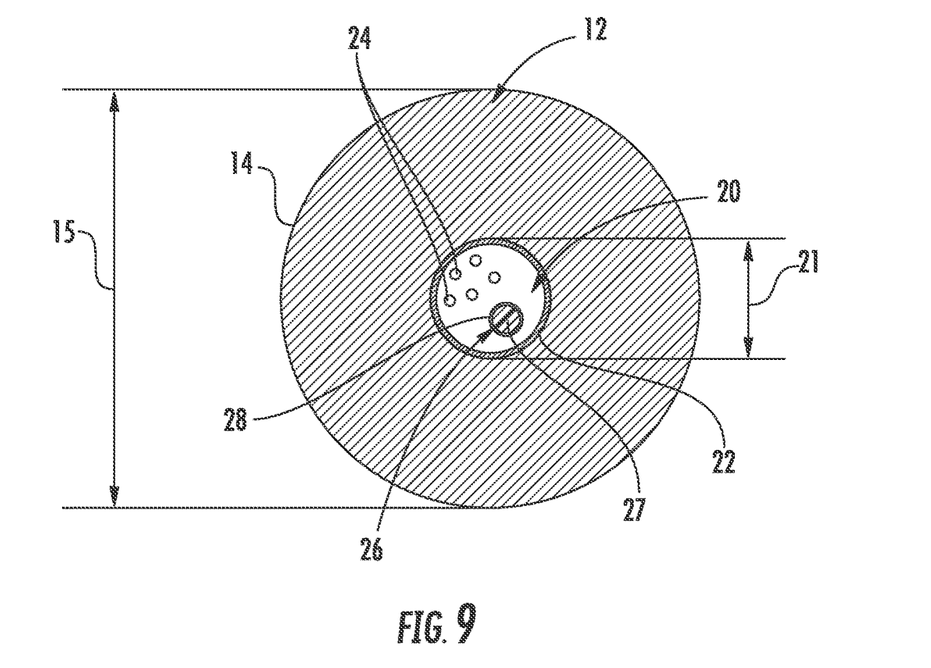
Figure 10:
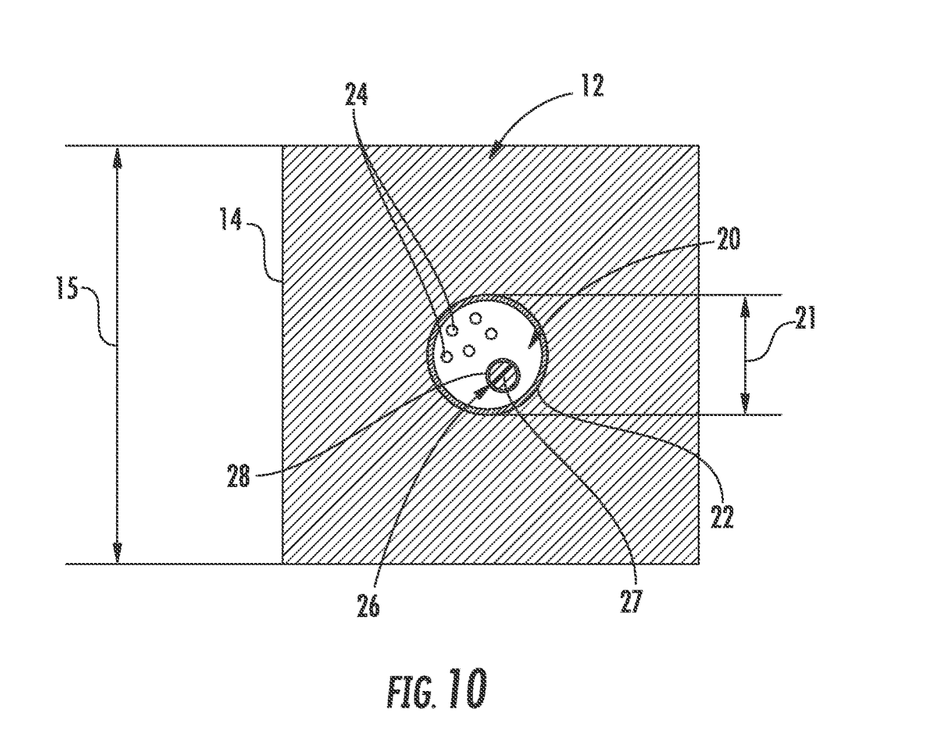
Figure 11:
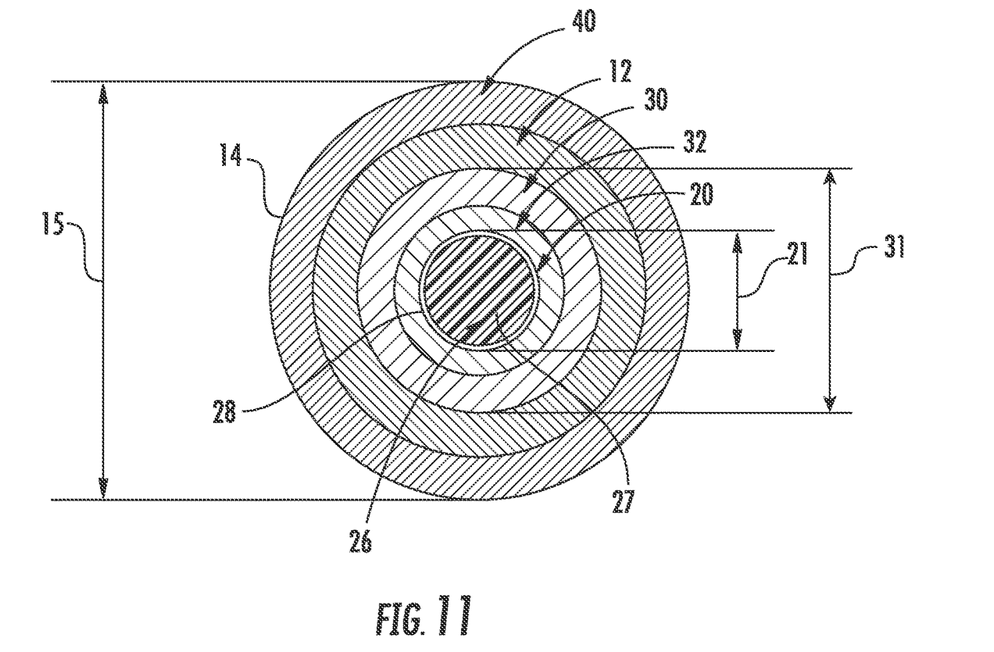
Figure 12:
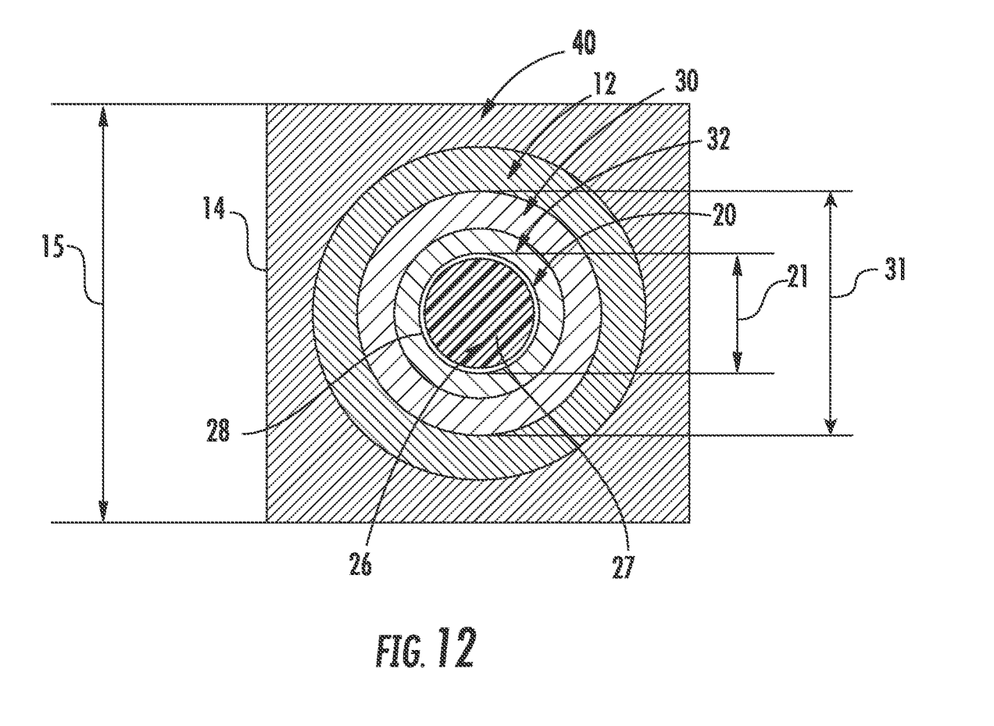
Figure 13:
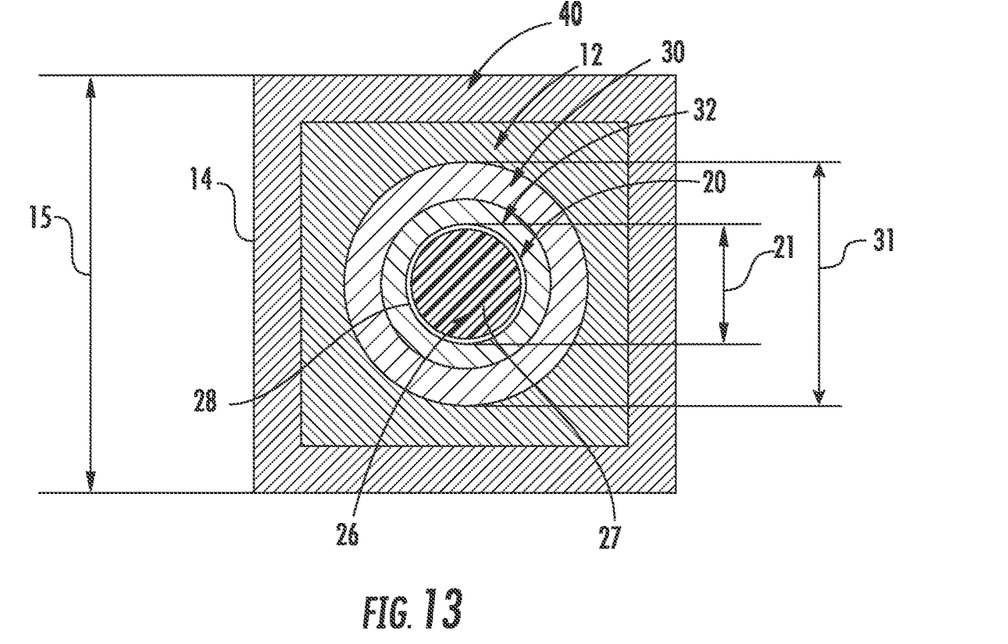
Figure 14:
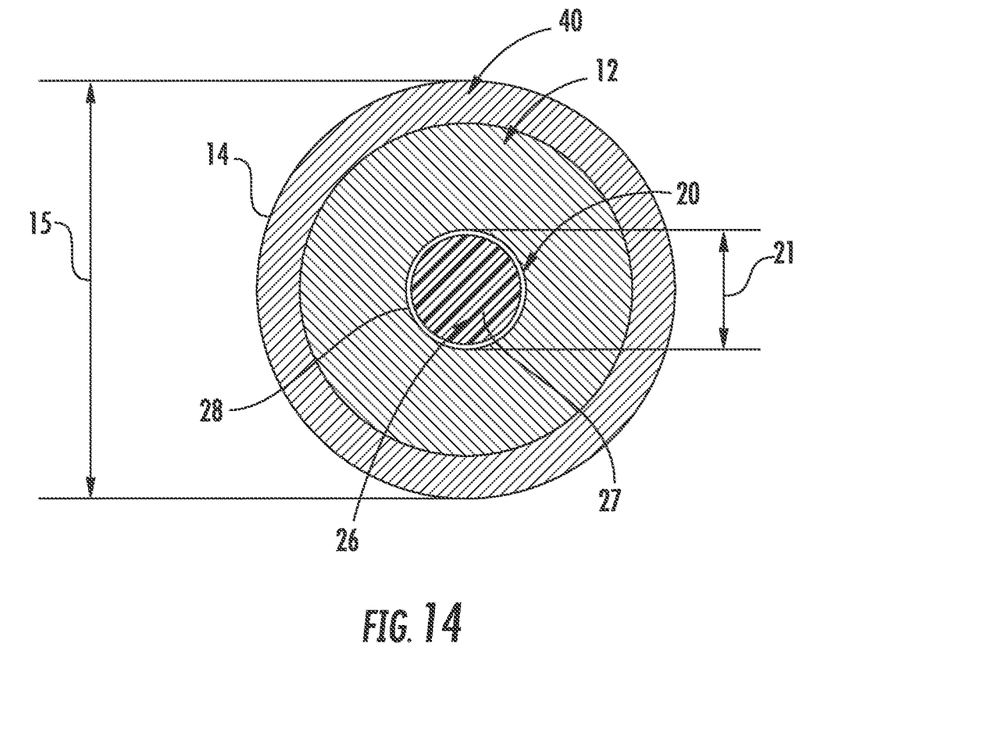
Figure 15:
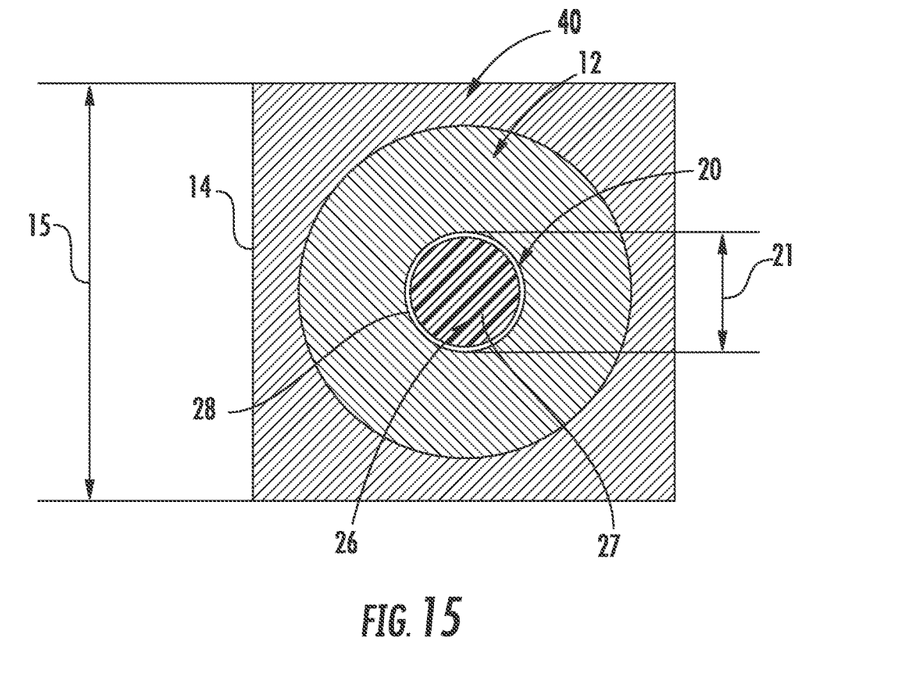
Figure 16:
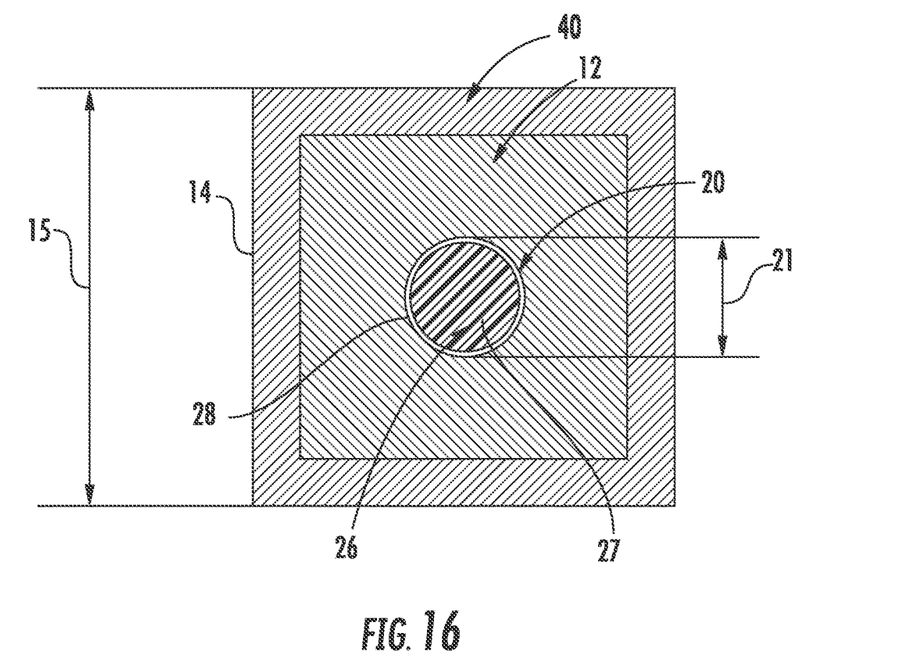
Figure 17:
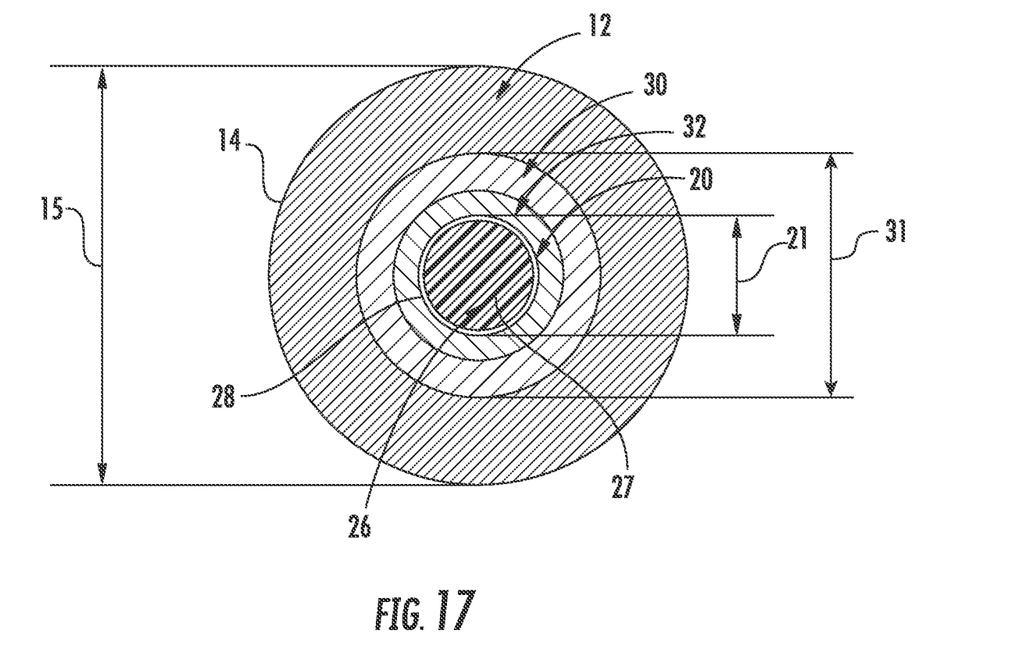
Figure 18:
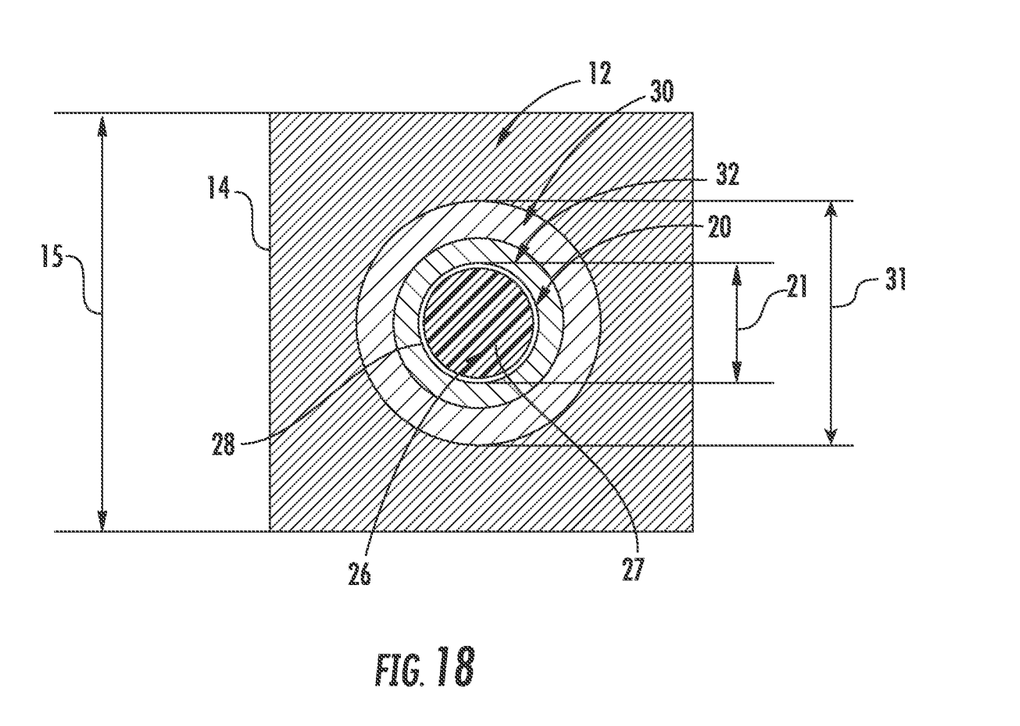
Figure 19:
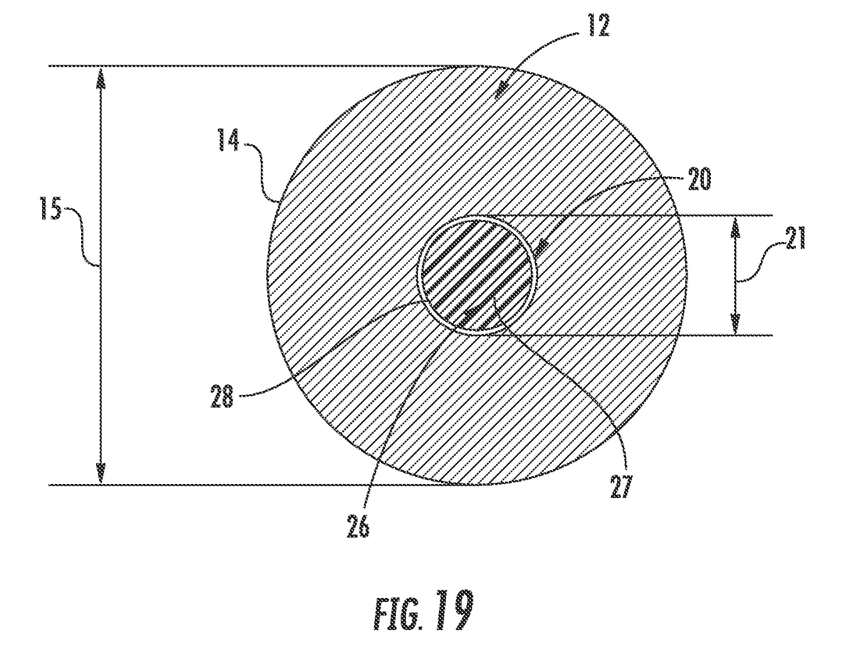
Figure 20:
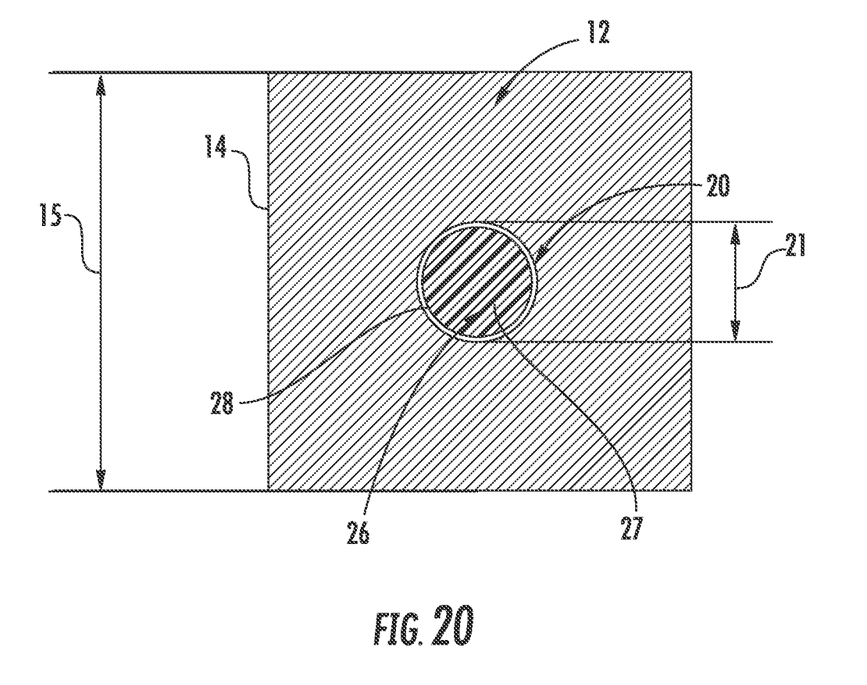

Referring now to FIGS. 1-20, various embodiments of downhole cables 10 in accordance with the present disclosure are provided. A downhole cable 10 in accordance with the present disclosure advantageously includes an aluminum encapsulation layer 12. The encapsulation layer 12 surrounds various core components of the downhole cable 10, such as a central core (which may include optical fibers and/or copper wire, thus providing optical and/or electrical conduction), an optional metal pipe, and an optional belting layer. Further, in some embodiments, the belting layer may additionally be formed from aluminum.

More particularly, in exemplary embodiments as discussed herein, the aluminum encapsulation layer 12 and optional belting layer may be extruded aluminum layers. Use of extruded aluminum layers provided numerous advantages for downhole cables 10 in accordance with the present disclosure. For example, the use of aluminum, and in particular extruded aluminum, provides significant cost-savings, reducing the overall cost of the downhole cable 10 and providing a robust, cost-effective downhole cable 10 to the relevant industries. Further, the use of extruded aluminum allows for formation (via the extrusion process) to a wide variety of shapes and volumes, thus advantageously providing improved and an increased number of downhole cable designs 10. Still further, the use of aluminum advantageously provides a hydrogen barrier in downhole cables 10, thus providing improved downhole cable 10 performance.

Aluminum encapsulation layer 12 and optional belting layer may be extruded using a suitable aluminum extrusion process. For example, an aluminum rod may be heated and provided to an extrusion die. The extrusion die may include a mandrel therein, and the die and associated mandrel may be utilized to form the aluminum rod into an extruded aluminum tube. The formed tube may have the desired shape and size for a desired downhole cable 10 application, or additional post-processing may be performed to adjust the formed tube to the desired shape and size. The use of extrusion processes and extruded aluminum tubes in accordance with the present disclosure is particularly advantageous due to the wide variety of available shapes and sizes, the relatively tight tolerances and high accuracies available, and the significant associated cost savings.

A cable 10 may include, for example, a central core 20. Central core 20 may, for example, have a maximum diameter 21 of less than or equal to 4.6 millimeters, such as less than or equal to 4.4 millimeters, such as less than or equal to 4.2 millimeters, such as between 4.4 millimeters and 2.2 millimeters, such as between 4.2 and 2.4 millimeters. The central core 20 may, in some embodiments as illustrated in FIGS. 1 through 10, include a metal tube 22. In these embodiments, an outer surface of metal tube 22 may define the maximum diameter 21. One or more optical fibers 24 may be disposed within metal tube 22. Further, in some embodiments, one or more copper wires or other suitable electrical conductors (which may for example be metal wires) 26 may be disposed within metal tube 22. Such conductor 26 may include an inner conductor core 27, and may further include an outer insulation layer 28.

Metal tube 22 may, for example, be formed from a stainless steel or a nickel alloy. Alternatively, other suitable metals may be utilized. In some embodiments, metal tube 22 may further include a gel disposed therein. Alternatively, no gel may be included. Further, in alternative embodiments, the metal tube 22 may be an open tube, thus being empty other than the optical fibers 24 and optional conductor(s) 26.

In other embodiments as illustrated in FIGS. 11 through 20, the central core 20 may include a single copper wire or other suitable electrical conductor (which may for example be a metal wire) 26, and an outer surface of this single conductor may define the maximum diameter 21. Such conductor 26 may include an inner conductor core 27, and may further include an outer insulation layer 28. The outer surface which defines the maximum diameter 21 may be the outer surface of the core 27 if no insulation layer is provided, or may be an outer surface of the outer insulation layer 28.

As shown, aluminum tube 12 (which in exemplary embodiments is an extruded aluminum tube as discussed herein) surrounds the central core 20. In some embodiments, as illustrated in FIGS. 4-6, 9-10, 14-16, and 19-20, the aluminum tube 12 may directly contact the central core 20, such as the outer surface of the metal tube 22 or the outer surface of the electrical conductor 26. In alternative embodiments, as illustrated in FIGS. 1-3, 7-8, 11-13, and 17-18, cable 10 may further include a metal pipe 30. The metal pipe 30 may be disposed between the central core 20 and the aluminum tube 12. Metal pipe 30 may, for example, be formed from a stainless steel or a nickel alloy. Alternatively, other suitable metals may be utilized. Metal pipe 30 may have a maximum diameter 31 of less than or equal to 6.45 millimeters, such as less than 6.43 millimeters, such as less than or equal to 6.42 millimeters, such as between 6.43 and 6.37 millimeters, such as between 6.42 and 6.38 millimeters, such as between 6.41 and 6.39 millimeters.

In some embodiments, an empty space may be defined between the metal pipe 30 and the central core 20 (such as the outer surface thereof). In alternative embodiments, the metal pipe 30 may contact the outer surface of the central core 20. In other alternative embodiments, a belting layer may be provided between the metal pipe 30 and central core 20. For example, in exemplary embodiments as shown in FIGS. 1-3, 7-8, 11-13, and 17-18, the aluminum tube 12 may be a first aluminum tube of the cable 10, and the cable 10 may further include a second aluminum tube 32 (which in exemplary embodiments is extruded as discussed herein). The second aluminum tube 32 may be disposed between the metal pipe 30 and the central core 20, and may further be in direct contact with an outer surface of the central core 20 and an inner surface of the metal pipe 30. Alternatively, however, the belting layer may be formed from another suitable material such as a suitable polymer or another suitable metal.

Downhole cable 10 may have an outermost exterior surface 14. Such surface 14 defines a maximum outer width 15 (which may in some embodiments be a maximum outer diameter) of the cable 10. In some embodiments, as shown in FIGS. 7-10 and 17-20, the aluminum tube 12 may include the outermost exterior surface 14 of the cable 10 and thus define the maximum outer width 15. In other embodiments, as illustrated in FIGS. 1-6 and 11-16, an encapsulation layer 40 may surround the aluminum tube 12. The encapsulation layer 40 may directly contact the aluminum tube 12. Further, the encapsulation layer 40 may include the outermost exterior surface 14 of the cable 10 and thus define the maximum outer width 15. Encapsulation layer 40 may be formed from a suitable plastic. For example, in some embodiments, encapsulation layer 40 may be formed from a polypropylene. Alternatively, encapsulation layer 40 may be formed from a fluoropolymer, such as perfluoroalkoxy alkane ("PFA"). Alternatively, encapsulation layer 40 may be formed from a polyaryletherketone ("PAEK"), such as polyether ether ketone ("PEEK"). Alternatively, encapsulation layer 40 may be formed from ethylene tetrafluoroethylene ("ETFE"). Alternatively, other suitable polymers may be utilized.

Downhole cables 10 in accordance with the present disclosure may have a wide variety of shapes and sizes. The use of extruded aluminum tube, in particular, advantageously facilitates the ease of formation of accurately sized and shapes cables 10 in accordance with consumer demands.

For example, in some embodiments, as shown in FIGS. 1, 4, 7, 9, 11, 14, 17, and 19, the downhole cable 10 has a circular cross-sectional profile. For example, in exemplary embodiments, each layer (i.e. the aluminum tube 12, central core 20, metal pipe 30, second aluminum tube 32, and/or encapsulation layer 40), may have a circular cross-sectional profile. In other embodiments, as shown in FIGS. 2, 3, 5, 6, 8, 10, 12, 13, 15, 16, 18, and 20, cable 10 has a square cross-sectional profile. In these embodiments, one or more layers of the cable 10 may have square cross-sectional profiles, while one or more other layers of the cable 10 may have circular cross-sectional profiles. For example, as discussed, in some embodiments, the aluminum tube 12 defines the maximum outer width 15. In some of these embodiments, as shown in FIGS. 7, 9, 17, and 19, the aluminum tube 12 has a circular cross-sectional profile. The central core 20 and optional metal pipe 30 and second aluminum tube 32 may, in these embodiments, have circular cross-sectional profiles. In other of these embodiments, as shown in FIGS. 8, 10, 18, and 19, the aluminum tube 12 has a square cross-sectional profile. The central core 20 and optional metal pipe 30 and second aluminum tube 32 may, in these embodiments, have circular cross-sectional profiles. In other embodiments, as discussed, the encapsulation layer 40 may define the maximum outer width 15. In some of these embodiments, as shown in FIGS. 1, 4, 11, and 14, the encapsulation layer 40 has a circular cross-sectional profile. The central core 20, aluminum tube 12, and optional metal pipe 30 and second aluminum tube 32 may, in these embodiments, have circular cross-sectional profiles. In other of these embodiments, as shown in FIGS. 2, 3, 5, 6, 12, 13, 15, and 16, the encapsulation layer 40 has a square cross-sectional profile. The central core 20 and optional metal pipe 30 and second aluminum tube 32 may, in these embodiments, have circular cross-sectional profiles. In some of these embodiments, as shown in FIGS. 2, 5, 12, and 15, the aluminum tube 12 may have a circular cross-sectional profile, while in other embodiments, as shown in FIGS. 3, 6, 13, and 16, the aluminum tube 12 may have a square cross-sectional profile.

As discussed, cable 10 is a downhole cable. Accordingly, cable 10 may be sized for such downhole applications. In exemplary embodiments, for example, the maximum outer width 15 may be less than or equal to 12 millimeters, such as less than or equal to 11.5 millimeters, such as between 12 millimeters and 10 millimeters, such as between 11.5 millimeters and 10.5 millimeters. It should be noted that "width" as utilized herein refers to, in the case of a circular or oval cross-sectional profile, the maximum diameter, and in the case of a square or rectangular cross-sectional profile, the maximum conventional width from side to opposite side, excluding diagonal measurements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A downhole cable, comprising:
   a central core, the central core comprising a metal tube having a plurality of optical fibers therein or a copper wire, wherein the central core has a maximum diameter less than or equal to 4.6 millimeters and greater than 2.2 millimeters;
   an extruded aluminum tube surrounding the central core; and
   a metal pipe disposed between the central core and the extruded aluminum tube, wherein the metal pipe has a maximum diameter between approximately 6.39 millimeters and approximately 6.45 millimeters,
   wherein the downhole cable has a maximum outer width of less than or equal to 12 millimeters.

2. The downhole cable of claim 1, wherein the downhole cable has a circular cross-sectional profile.

3. The downhole cable of claim 1, wherein the downhole cable has a square cross-sectional profile.

4. The downhole cable of claim 1, wherein the extruded aluminum tube comprises an outermost exterior surface of the cable.

5. The downhole cable of claim 1, further comprising an encapsulation layer surrounding the extruded aluminum tube, the encapsulation layer formed from a plastic and comprising an outermost exterior surface of the cable.

6. The downhole cable of claim 5, wherein the metal pipe comprises a stainless steel or a nickel alloy.

7. The downhole cable of claim 6, wherein the extruded aluminum tube is a first extruded aluminum tube, and further comprising a second extruded aluminum tube disposed between the metal pipe and the central core.

8. The downhole cable of claim 5, wherein the plastic comprises a polypropylene, a fluoropolymer, a polyaryletherketone, or an ethylene tetrafluoroethylene.

9. The downhole cable of claim 1, wherein the metal pipe comprises a stainless steel or a nickel alloy.

\* \* \* \* \*